United States Patent
Pfuetzenreuter et al.

(10) Patent No.: US 9,878,762 B2
(45) Date of Patent: Jan. 30, 2018

(54) SYSTEM FOR LAUNCHING AND RECOVERING AN UNDERWATER VEHICLE

(71) Applicant: Fraunhofer-Gesellschaft zur Foerderung der angewandten Forschung e. V., Munich (DE)

(72) Inventors: Torsten Pfuetzenreuter, Langewiesen (DE); Thomas Rauschenbach, Ilmenau (DE); Gunnar Brink, Karlsruhe (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 0 days.

(21) Appl. No.: 15/078,715

(22) Filed: Mar. 23, 2016

(65) Prior Publication Data
US 2017/0253301 A1  Sep. 7, 2017

(30) Foreign Application Priority Data

Mar. 4, 2016  (DE) .................... 20 2016 101 197 U

(51) Int. Cl.
*B65G 7/02*  (2006.01)
*B63B 1/00*  (2006.01)
(Continued)

(52) U.S. Cl.
CPC ............. *B63B 27/10* (2013.01); *B63B 27/16* (2013.01); *B63B 27/36* (2013.01); *B65G 67/20* (2013.01);
(Continued)

(58) Field of Classification Search
CPC .... B65D 88/121; B65D 90/00; B65D 88/126; E04H 2001/1283; B65G 67/02; B65G 67/20; E04B 1/3444; G21F 5/14

USPC ................. 114/238, 239, 258, 259; 121/180; 182/63.1; 212/180, 271, 294; 220/1.5; 410/69, 70; 414/139.9, 140.4, 141.3,
(Continued)

(56) References Cited

U.S. PATENT DOCUMENTS 2,995,986 A * 8/1961 Carlberg .................. B63G 1/00
                                                   89/1.802
3,811,579 A * 5/1974 Black ..................... B65G 67/20
                                                   414/347
(Continued)

FOREIGN PATENT DOCUMENTS

DE  2 043 516 A    12/1971
DE  100 45 911 B4   4/2002
(Continued)

OTHER PUBLICATIONS

German Office Action in DE 20 2016 101 197.3, dated Nov. 24, 2016.
(Continued)

*Primary Examiner* — Gregory W Adams
(74) *Attorney, Agent, or Firm* — Collard & Roe, P.C.

(57) ABSTRACT

A system for launching and recovering an underwater vehicle (18), which system comprises a crane (16) and a storage location for at least one underwater vehicle (18), wherein the crane (16) is attached to the bottom of a first container (12) and the storage location is provided in a second container (14), said first container (12) being arranged on the second container (14) during an operation of launching or an operation of recovering.

8 Claims, 3 Drawing Sheets

Figure 1:
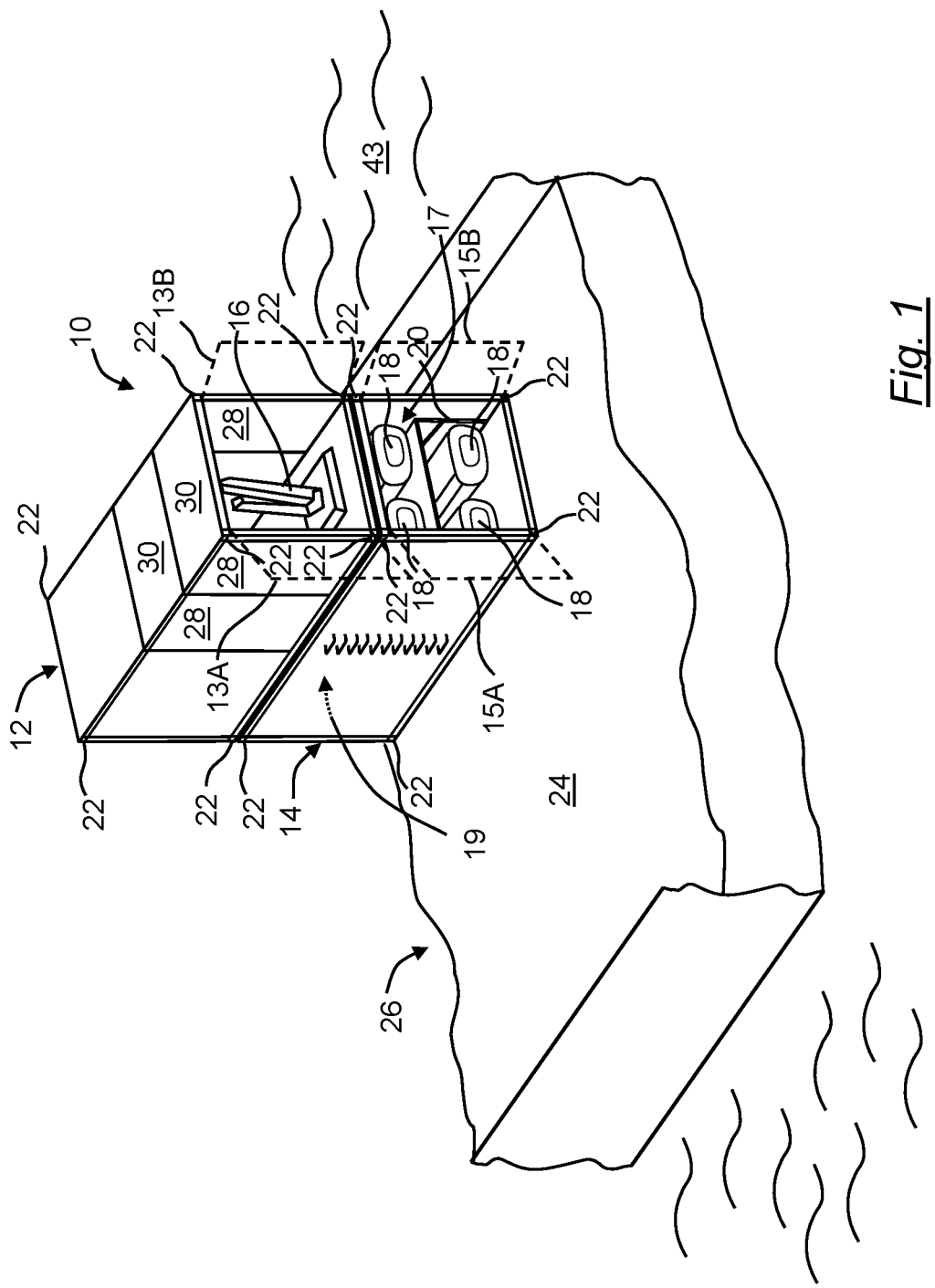

(51) Int. Cl.
  *B63B 27/10* (2006.01)
  *B65G 67/20* (2006.01)
  *B63B 27/16* (2006.01)
  *B63B 27/36* (2006.01)
  *B66C 13/02* (2006.01)
  *B66C 23/20* (2006.01)
  *B66C 23/52* (2006.01)

(52) U.S. Cl.
  CPC ............ *B66C 13/02* (2013.01); *B66C 23/206* (2013.01); *B66C 23/52* (2013.01); *B63B 2027/165* (2013.01)

(58) Field of Classification Search
  USPC ............... 414/141.6, 142.6, 142.7, 542, 545; 52/79.1, 79.9; 82/1.11, 1.809, 1.81
  See application file for complete search history.

(56) References Cited

U.S. PATENT DOCUMENTS

| | | | | |
|---|---|---|---|---|
| 4,390,040 A * | 6/1983 | Beyen | ............... | F17C 13/12 137/340 |
| 4,676,339 A * | 6/1987 | Rybka | ............... | B66C 19/002 182/142 |
| 5,253,605 A * | 10/1993 | Collins | ............... | B63B 21/66 114/258 |
| 5,253,606 A * | 10/1993 | Ortelli | ............... | B63B 27/36 114/259 |
| 5,832,676 A * | 11/1998 | Gillmore | ............... | E04B 1/3431 248/654 |
| 6,612,067 B2 * | 9/2003 | Topp | ............... | A01M 19/00 422/307 |
| 7,726,497 B1 * | 6/2010 | Updegrove | ............... | B66C 23/206 212/179 |
| 8,561,564 B2 * | 10/2013 | Brenner | ............... | F41F 3/08 114/238 |
| 8,591,161 B1 | 11/2013 | Bernhardt | | |
| 8,826,600 B2 * | 9/2014 | Wallance | ............... | E04B 1/003 52/79.1 |
| 8,826,601 B2 * | 9/2014 | Gyory | ............... | E04B 1/3444 16/368 |
| 9,221,599 B2 * | 12/2015 | Brennan, Jr. | ............... | B65D 90/08 |
| 2008/0011745 A1 * | 1/2008 | Ferrini | ............... | B65D 88/522 220/4.29 |
| 2008/0266165 A1 * | 10/2008 | Daly | ............... | G01S 7/02 342/22 |
| 2012/0077429 A1 * | 3/2012 | Wernimont | ............... | F24F 3/161 454/187 |
| 2012/0251286 A1 * | 10/2012 | Van Der Velden | ............... | B63B 27/10 414/732 |
| 2013/0299489 A1 * | 11/2013 | Dinter | ............... | B65D 88/121 220/1.5 |
| 2013/0321622 A1 * | 12/2013 | Safreno | ............... | H04N 7/18 348/143 |
| 2014/0174283 A1 * | 6/2014 | Kempas | ............... | F41A 23/20 89/1.815 |
| 2016/0023722 A1 | 1/2016 | Hesse | | |

FOREIGN PATENT DOCUMENTS

| | | |
|---|---|---|
| DE | 10 2011 002 108 A1 | 10/2012 |
| DE | 10 2013 207 731 A1 | 10/2014 |
| EP | 2 196 427 A1 | 6/2010 |
| KR | 2012 0111447 A | 10/2012 |
| WO | 2013/014620 A1 | 1/2013 |

OTHER PUBLICATIONS

International Search Report of PCT/EP2017/055101, dated Jun. 23, 2017 with English translation of the relevant parts.

* cited by examiner

SYSTEM FOR LAUNCHING AND RECOVERING AN UNDERWATER VEHICLE

CROSS REFERENCE TO RELATED APPLICATIONS

Applicant claims priority under 35 U.S.C. § 119 of German Application No. 20 2016 101 197.3 filed on Mar. 4, 2016, the disclosure of which is incorporated by reference.

The invention relates to a system for launching and recovering an underwater vehicle, which system comprises a crane and a storage location for at least one underwater vehicle.

Conventionally, underwater vehicles, especially autonomous underwater vehicles, are launched from a mother ship into the sea water and recovered again after the completion of an autonomously conducted mission, i.e. brought to the mother ship.

Such missions can last many hours or days. During this time, weather deterioration may occur. It is particularly problematic when the sea state and wave height increase. Regularly the mother ship is in fact much larger than the underwater vehicle. This means that due to the sea state or wind and waves the underwater vehicle performs a three-dimensional relative movement with respect to the mother ship. Normally these relative movements cannot be compensated by the drives of the underwater vehicle if the wave height is too high, if the wind is too strong and/or if the rolling movements of the mother ship have become too large.

In such a case, the crew of the mother ship regularly has no choice but to wait until the weather and sea conditions have improved again.

The very high costs incurring per day or per hour with operation of the mother ship are disadvantageously with respect to this procedure.

Another disadvantage of conventional systems for conducting missions with autonomous underwater vehicles is that the battery capacities of such underwater vehicles are limited and additionally that often servicing of the underwater vehicle are required after carrying out a mission. Also the reading of data which have been obtained during a mission can take a long time. This also results in substantial delays until another mission can be carried out. These waiting times also involve high costs.

The invention is therefore based on the object to reduce the costs associated with the execution of missions with underwater vehicles.

The invention solves this problem with a system for launching and recovering an underwater vehicle with the features described herein.

The inventive system thus provides for a crane that is attached to the bottom of a first container and a storage location for at least one underwater vehicle, which storage location is provided in a second container. The first container is arranged on the second container at least during an operation of launching or recovering, but preferably throughout the entire duration of a mission.

By this arrangement of a crane-containing container on another container containing one or several underwater vehicles a very space-saving system configuration is possible. Due to the vertical arrangement of the container above the storage room of the underwater vehicle(s) the floor space of the mother ship can be kept very small. Thus, a smaller and thus more cost-effective mother ship can be selected.

But the savings in floor space can also be provided wholly or partly for other equipment. For example, instead of one underwater vehicle a plurality of underwater vehicles can be taken on board of the mother ship. Several underwater vehicles then can either alternate during several missions or they can be used for several missions carried out simultaneously. Thus, the driving time of the mother ship is shortened if several predetermined tasks, for example exploratory trips, can be carried out or if several missions of underwater vehicles which are to be performed successively can be carried out without waiting time between the individual missions.

In addition, the invention allows to provide the crane, which crane is necessary for launching and recovering an underwater vehicle, in a transportable manner. I.e., also a mother ship without an onboard crane can be used since the crane is provided mobile in the container. Thereby, also simple ships can be used as a mother ship, which simple ships have not been built primarily for carrying out missions with underwater vehicles. Such ships only need a storing place for a container.

Moreover, the system configuration with a crane disposed in an upper container allows to set up the crane at different positions on the deck of a ship. For fixed cranes an underwater vehicle can always be deployed only by one and the same position into the seawater. By contrast, the system configuration according to the invention allows to set up the crane, for example, on the starboard or port side or the stern. By these means the flexibility of the mother ship for various purposes is maintained. For example, the system according to the invention also allows to carry out missions with underwater vehicles on pure container ships that do not have their own on-board crane.

For example, a mission can be planned in a way that one or several underwater vehicles are launched into the sea during the voyage of the mother ship. For this purpose a position of the crane on the stern of a ship is particularly advantageously suitable, since by these means the risk of a collision of the underwater vehicle with the mother ship is particularly low. Particularly, with such a launch position, rolling motion of the mother ship does play only a minor role, whereas in the case of lateral launching of the underwater vehicle, i.e. on the starboard or port side, rolling motion of the mother ship involves an increased risk of collision between the mother ship and the underwater vehicle. Thus, the invention also allows the launch of an underwater vehicle in rough seas. Thus, missions can be started despite rough seas especially when it is foreseeable that calming of the sea weather will have taken place at the end of the mission.

The invention thus allows positioning of a mobile crane system at a place being ideal for a mission.

According to an embodiment of the invention, the upper first container containing the crane comprises side wall members that are releasably attached to the remaining parts of this container, thereby being detachable and mountable again. The resulting removability of side wall members allows the crane extension arm to have a great freedom of movement. In particular, during detaching of the side wall members also corner posts of the container are removed. These corner posts either stand autonomously on corner fittings of the container or these corner posts are integrated into the side wall members.

According to a further embodiment of the invention, the first container comprises at least one roof member, which roof member is releasably attached to the remaining part of the container, thereby being detachable and mountable again. Thus, at least a part of the roof of the upper container can also be removed, thereby increasing the freedom of movement of the crane, in particular of the crane extension arm, in the vertical direction.

Overall, this results in the possibility that the crane housed in the first container is placed almost free on the second container containing one or several underwater vehicles, the crane thus having the benefit of a significant freedom movement.

According to a further embodiment of the invention, the crane comprises an extension arm with a plurality of telescope elements, which telescope-elements coact telescope-like. These telescope elements are retractable and extendable, whereby the horizontal reach of the crane is significantly increased. Such increase of the range is advantageous because a wide range of the crane extension arm allows operation of the crane also at greater rolling or pitching motions of the mother ship, in particular during launching or recovering of an underwater vehicle. Moreover, such a telescoped setup of the crane extension arm allows a small required space in the retracted state of the extension arm and thus a small required storage space when the crane is not needed. This setup thus makes it possible to house a relatively large crane extension arm in containers being small relative to the size of the crane extension arm. This setup is therefore also advantageous because it reduces the space requirements of a large crane. Thus, since the footprint remains small despite a large crane, a smaller mother ship can be operated and/or the mother ship can be entrusted with further assignments, thereby reducing in total the costs associated with the mother ship.

An embodiment of the invention provides that the part of the first container, which part remains at least partially surrounded after detaching the detachable removable side wall and roof members, is arranged as storage room for the detached side wall and roof members and/or as a control room for the control of the crane and/or a mission of an underwater vehicle. This construction allows an advantageous space-saving storage of the removed members, which members therefore do not need to be kept at or below the deck of the mother ship. In addition, this construction is advantageous because the control room thus is in an elevated position, thus giving an operator an almost unobstructed view over the side of the mother ship.

According to an embodiment of the invention ladder spokes are placed at the outside of the lower second container. These ladder spokes are advantageous to allow an operator to access the platform of the crane, i.e. the bottom plane of the upper first container, from the deck level via the lower second container.

A further embodiment of the invention provides that the second lower container comprises one or more drawer mechanisms with a receiving device each for receiving an underwater vehicle, which drawer mechanisms are relocatable horizontally in the second container's longitudinal direction. By these means, an underwater vehicle can be provided before to the front end of the second lower container by pulling out or by driving out a drawer mechanism. The above arranged crane can therefore pick up the underwater vehicle and by pivoting the extension arm over the side of the mother ship immerse it into water.

According to a further embodiment of the invention at least two drawer mechanisms are provided one above another for several underwater vehicles, in particular for two or four underwater vehicles. Thanks to such an arrangement further space can be saved when several underwater vehicles are to be stored on board of the mother ship.

According to another embodiment of the invention, the second container comprises a first region for receiving the one or several underwater vehicles, said first region being arranged contiguous to a front end container door, in particular a double-wing container door. Moreover, the second container advantageously comprises a second region being arranged for storage of accessories and alteration parts of the underwater vehicle, particularly for the storage of drive batteries, battery charging devices and data memory components. This embodiment allows an optimal use of the available space.

Another embodiment of the invention provides that the first and the second container are designed as standard containers with corner fittings, i.e. ISO-containers. This design is advantageous since standard transporting means, in particular truck trailers, container gantry cranes and container storage places are provided for such standardized containers, in particular on board of ships. Thus, resorting to inexpensive standard components etc. is possible.

According to a further embodiment of the invention the first container, which first container houses the crane, comprises a reinforced bottom assembly which transmits the forces and moments being exerted on the bottom assembly from the base of the crane during launching and recovering an underwater vehicle to the bottom-side corner fittings of the first container. In particular due to rough seas and/or rolling movements of the mother ship, considerable forces and moments can be exerted on the bottom assembly of the upper container during launching and recovering an underwater vehicle with a laterally swiveled extension arm. These forces and moments must be transmitted to the mother ship, so that the upper container can stay in place. These forces and moments are transmitted via the bottom-side corner fittings of the upper container to the lower container and are transferred from the corner posts of the lower container to the deck of the mother ship. For this purpose, corresponding locking elements and lashing bars are provided, as they are used as standard in container shipping. Resorting to such standard components allows a cost-effective system for launching and recovering underwater vehicles.

Figure 2:
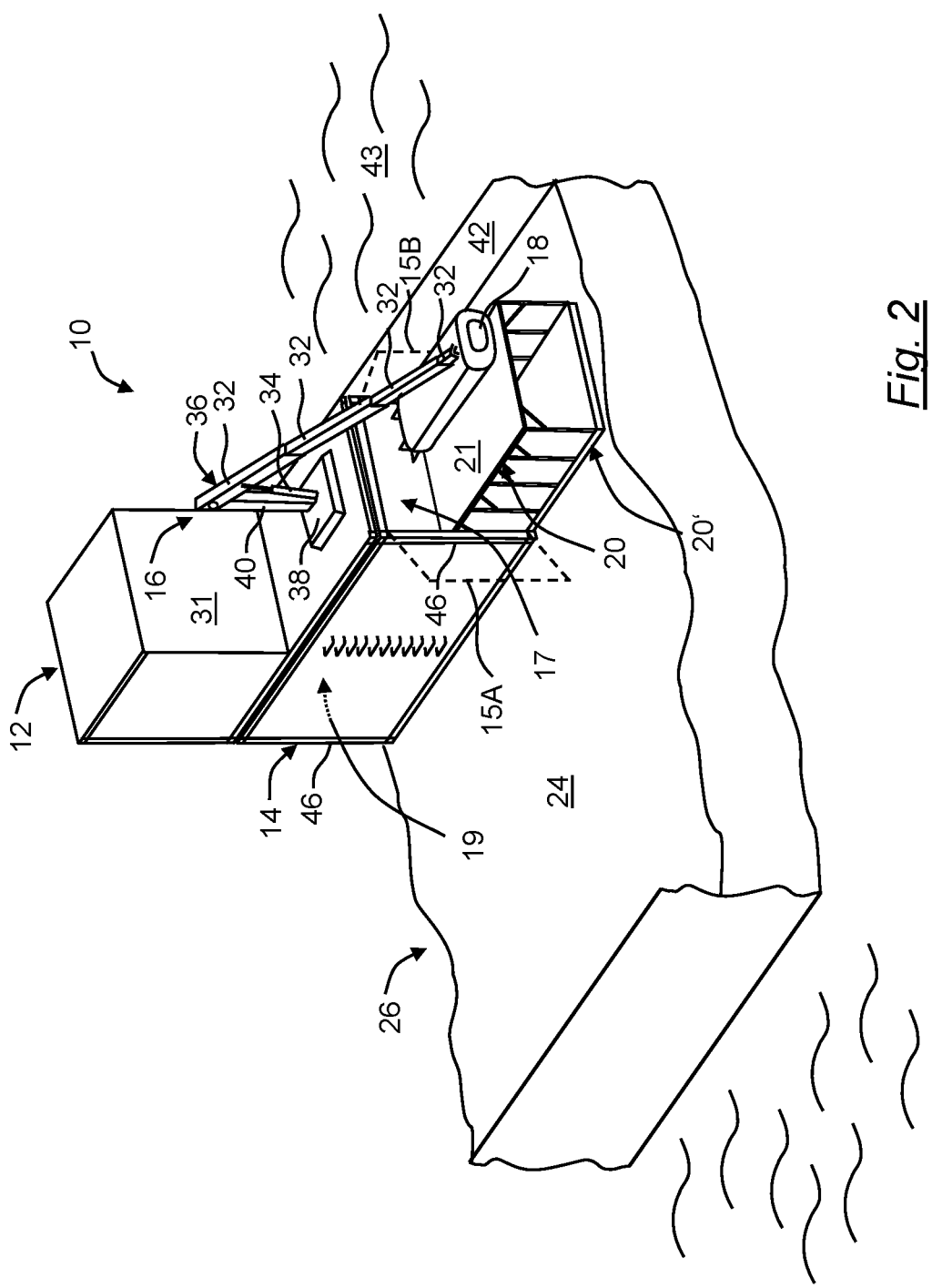
Figure 3:
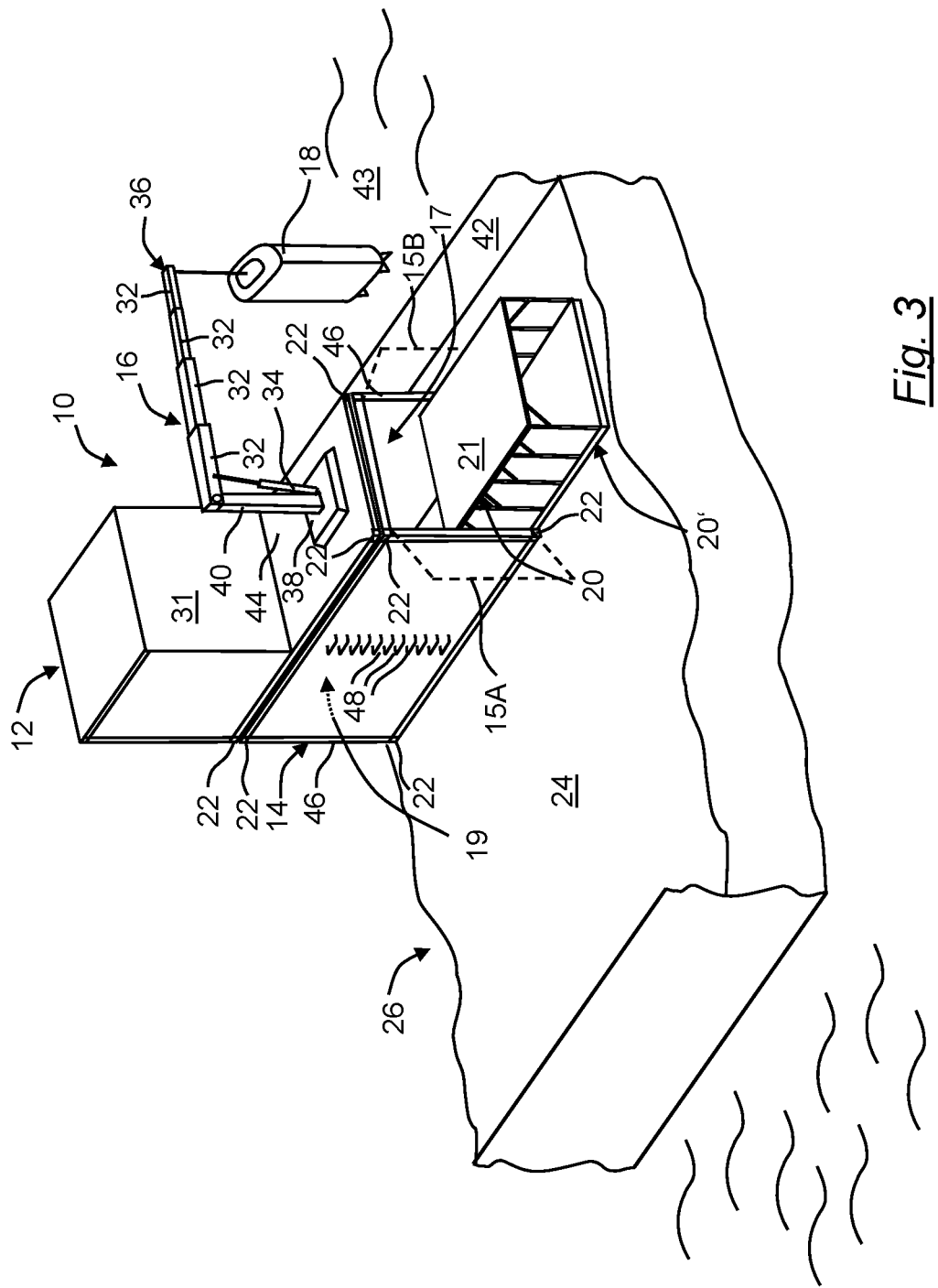

Further embodiments of the invention result from the claims and from the embodiments explained with reference to the drawings. The drawings illustrate:

FIG. 1 a system according to the invention for launching and recovering underwater vehicles, FIG. 2 a system according to FIG. 1 in a state during launching an underwater vehicle and FIG. 3 the system according to FIG. 1 and FIG. 2 in a state just before the underwater vehicle is immersed into the water.

FIG. 1 shows a system 10 according to the invention, said system 10 comprising two maritime containers, namely a first upper container 12 and a second lower container 14. The upper container 12 houses a crane 16. The lower container 14 houses one or several underwater vehicles 18, particularly autonomous underwater vehicles (AUV: autonomous underwater vehicle), i.e. underwater vehicles that can operate autonomously for several hours or days and that are used for example in preparing the laying of deep-sea cables or for the inspection of deep-sea cables, for surveying the seafloor, to secure sea lanes, for safety purposes by the Coast Guard, in deep-sea mining or by the industry extracting oil and gas from the deepwater.

In the illustrated embodiment, the lower container 14 houses four such underwater vehicles 18, in each case two underwater vehicles 18 being mounted on one of two drawer mechanisms 20, 20' which are relocatable horizontally. The drawer mechanisms 20, 20' comprise a receiving device 21 each for receiving an underwater vehicle 18. Alternatively, every single underwater vehicle 18 can be stored on a separate drawing mechanism 20, 20'. With sufficient size of the container 14, also several underwater vehicles 18, for example two, can be stored successive on a drawer mechanism, so that, for example, six to eight underwater vehicles 18 can be housed in the lower container 14.

The containers 12, 14 have front end double-wing doors 13A, 13B and 15A, 15B, with which they can be locked and protected against wind and weather. For purposes of illustration, these doors are drawn in broken lines.

The second container 14 comprises a first region 17 for receiving one or several underwater vehicles 18. The first region 17 is arranged contiguous to the front end container door 15A, 15B, preferably being a double-wing container door 15A, 15B. The second container 14 further comprises a second region 19 being arranged for storage of accessories and alteration parts of the underwater vehicle(s) 18, particularly for the storage of drive batteries, battery charging devices and data memory components.

Moreover, lashing bars may be provided to prevent a lateral tilting of the containers 12, 14 on the rear front end side. Due to the mechanical coupling of the containers 12, 14 with each other as well as the mechanical coupling of the lower container 14 with the mother ship 26, tipping over of the two containers 12, 14 is prevented even under the effect of tilting moments or lateral forces.

The upper container 12 comprises specially designed side wall members 28 which are releasably attached to the remaining part of this container 12. These side wall members 28 may be removed in this manner, so that the crane 16, which is arranged in the region of the front end door 13A, 13B can be made available. These side wall members 28 can therefore be easily detached and mounted again. In an analogous manner, the upper container 12 comprises one or more roof members 30 being releasably mounted to the remaining part of this container 12. These roof members 30 can therefore also be easily removed and thus easily be detached and mounted again.

FIG. 2 shows the upper container 12 with detached side wall members 28 and detached roof members 30. The detached side wall members 28 and roof members 30 are temporarily stored in the rear remaining part of the container 12 which thus constitutes a storage room 31 which thus constitutes a storage room 31 for the detached side wall members 28 and roof members 30.

FIG. 2 additionally shows that the drawer mechanisms 20, 20' of the lower container 14 are pulled out horizontally in the longitudinal direction of the lower container 14. The crane 16 has extended several of its telescopic elements 32 and engages the underwater vehicle 18 with the outermost telescopic element 32 ora receiving organ being attached to the outermost telescopic element 32.

Furthermore, the crane 16 comprises a cylinder-piston unit 34, with which the crane extension arm 36, which crane extension arm comprises the plurality of telescoping members 32, can be pivoted in height. In addition, the crane 16 comprises drive means for being able to rotate a column 40 about a vertical axis, the column 40 standing on the crane base 38, wherein the crane extension arm 36 is hinged with respect to the column 40. The end of the crane extension arm 36 is thus movable three-dimensionally in space, enabling to launch the underwater vehicle from its storage position in the drawer mechanism 20 over the side 42 into the surrounding seawater 43.

FIG. 3 shows the process of launching, wherein the crane extension arm 36 is substantially extended to the maximum to immerse the underwater vehicle 18 into the water.

The upper container 12 comprises a reinforced bottom assembly 44 which transmits the forces and moments being exerted on the bottom assembly 44 from the crane base 38 during launching and recovering an underwater vehicle to the bottom-side corner fittings 22 of the upper container 12 and from these corner fittings to the corner fittings of the lower container 14. Via the corner posts 46 of the lower container 14 these forces and moments are transmitted to the mother ship 26.

Preferably, the containers 12, 14 are 20-foot containers or 40-foot containers which can be transported on conventional trailers for trucks.

Preferably, the lower container 14 comprises ladder spokes 48 placed at its outside. Via these ladder spokes 48 an operator can access the platform of the crane 16, i.e. the region of the upper first container, from the deck level. Advantageously, the operator controls the operation of launching or the operation of recovering from the upper container 12, since thanks to the elevated position a better view especially over the side 42 is made possible, thereby facilitating the control and management of an operation of launching or recovering.

The rear part of the upper container 12, which remains after detaching the side wall and roof members 28, 30, advantageously comprises a control room for the control of the crane 16 and/or the mission of the underwater vehicle 18. Additionally or alternatively, a control room for controlling the mission of the underwater vehicle 18 is arranged in the lower container 14.

The system 10 of two superposed containers 12, 14 according to the invention permits a very space-saving arrangement of a system for launching and recovering underwater vehicles 18 aboard a mother ship 26. In particular, this system is completely portable and requires no crane fixed on the deck of a ship. This system can be used on any ship that has a storage place for a container. For missions with underwater vehicles almost any ship can be used thanks to the invention, thus allowing to select a cost-effective ship.

Moreover, also only a one-time training of operator personnel is required since the operator personnel always works with the same equipment including the crane and thus must be made familiar only with this equipment.

All features referred to in the above description and in the claims can be combined with the features of the independent claims both individually and in any combination. The disclosure of the invention is therefore not limited to the described or claimed combinations of features. Rather, all combinations of features being meaningful with respect to the invention are to be considered as being disclosed.

The invention claimed is:

1. A system for launching and recovering an underwater vehicle, which system comprises a crane and a storage location for at least one underwater vehicle,
   wherein the crane is attached to the bottom of a first container and the storage location is provided in a second container, said first container being arranged on the second container during an operation of launching or an operation of recovering;
   wherein the second container comprises one or more drawer mechanisms with a receiving device each for receiving an underwater vehicle, which drawer mechanisms are relocatable horizontally in the second container's longitudinal direction; and wherein at least two drawer mechanisms are arranged one above the other.

2. The system according to claim 1, wherein the crane comprises an extension arm with a plurality of telescope elements, which telescope elements coact telescope-like.

3. The system according to claim 2, wherein a part of the first container is arranged as a storage room and/or as a control room for the control of the crane and/or as a control room for the control of a mission of an underwater vehicle.

4. The system according to claim 1, wherein a part of the first container is arranged as a storage room and/or as a control room for the control of the crane and/or as a control room for the control of a mission of an underwater vehicle.

5. The system according to claim 1, wherein ladder spokes are provided, which ladder spokes are placed at the outside of the second container.

6. The system according to claim 1, wherein the second container comprises a first region for receiving the one or several underwater vehicles, said first region being arranged contiguous to a front end container door, said container door preferably being a double-wing container door, and the second container comprises a second region, said second region being arranged for storage of accessories and alteration parts of the underwater vehicle(s).

7. The system according to claim 1, wherein the first and the second container are maritime containers being designed as standard containers with corner fittings.

8. The system according to claim 7, wherein the first container comprises a reinforced bottom assembly, which bottom assembly transmits the forces and moments which are exerted from the base of the crane on the bottom assembly to the bottom-side corner fittings of the first container.

* * * * *